United States Patent Office 2,835,663
Patented May 20, 1958

2,835,663

COPPERABLE DISAZO DYESTUFFS

Jakob Benz, Basel, Switzerland, assignor, by mesne assignments, to Saul & Co., Newark, N. J., as nominee of Fidelity Union Trust Company, executive trustee under Sandoz Trust No Drawing. Application May 19, 1955
Serial No. 509,673

Claims priority, application Switzerland May 21, 1954

6 Claims. (Cl. 260—153)

The present invention relates to new copperable disazo dyestuffs and their preparation.

It has been found that new copperable disazo dyestuffs are obtained when 1 mole of a six-membered triazine compound containing not more than three replaceable halogen atoms attached to carbon atoms, 2 moles of a naphthalene derivative having the general formula:

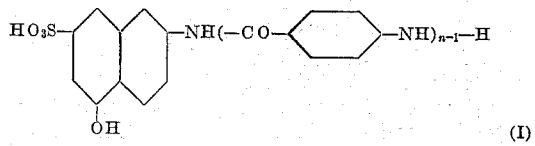

(I)

where $n$ denotes the number 1 or 2, 1 mole of a diazotised 2-amino-1-hydroxybenzene which contains attached to the nucleus an alkylsulfonyl group or a sulfonic acid amide group which may be further substituted on the nitrogen atom, and 1 mole of a diazotised 2-amino-1-hydroxybenzene which may carry further substituents commonly present in azo dyestuffs, are allowed to react upon each other in such a way that the primary amino groups of the 2 moles of the naphthalene derivative of general Formula I are transferred to 2 carbon atoms of the triazine compound with removal of hydrogen halide, while the 2 moles of the diazotised 2-amino-1-hydroxybenzenes each react with the 6-position of the 2 moles of the naphthalene derivative of general Formula I; should a third replaceable halogen atom be present on the triazine ring of the resulting disazo dyestuff it may be replaced by a hydroxyl group or a primary, secondary or tertiary amino group by treatment with alkali, ammonia or a primary or secondary amine.

Valuable mixtures of disazo dyestuffs according to this invention are obtained when 2 moles of a mixture in any desired proportions of two or more different naphthalene derivatives of general Formula I are employed in place of the 2 moles of a naphthalene derivative of general Formula I.

Depending on the method of preparation employed, the new copperable disazo dyestuffs may be obtained as homogeneous products or as mixtures of different components, all of which however correspond to the general formula:

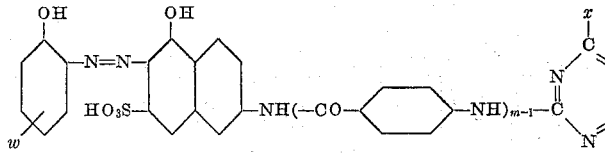

wherein $x$ stands for halogen, the hydroxy group or a primary, secondary or tertiary amino group, $w$ stands for a lower alkylsulfonyl group, the sulfonic acid amide group or a sulfonic acid amide group, the nitrogen atom of which may be substituted by lower alkyl, lower hydroxyalkyl, lower alkoxyalkyl, arylalkyl or aryl groups, HO—R stands for substituted residue of a hydroxybenzene, the hydroxy group of which is in ortho-position to the —N=N-group and the substituents of which belonging to the group consisting of halogen atoms, lower alkyl, nitro, acylamino, lower alkylsulfonyl, sulfonic acid and sulfonic acid amide groups, which may be substituted on the nitrogen atom, $m$ and $n$ stand for one of the numerals 1 and 2.

Particularly valuable are the symmetrical, copperable disazo dyestuffs of general Formula II wherein

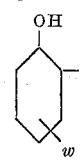

and R—OH represent the radicals of 2-amino-1-hydroxy-4-methylsulfonylbenzene, 2-amino-1-hydroxybenzene-4-sulfonic acid amide or 2-amino-1-hydroxybenzene-4-sulfonic acid methylamide, $x$ the radical of the aminobenzene derivative, and $m$ and $n$ the number 1.

The dyestuffs, in the form of their water-soluble alkaline salts, are dark-colored powders characterised by very high affinity for vegetable fibers. Their coppered dyeings on cotton and regenerated cellulosic fibers are a clear bluish red in shade and possess very good fastness to light and washing. The coppering process can be carried out by the customary single-bath or aftercoppering methods. Uncoppered dyeings may also be treated with cationic—possibly basic—complex copper compounds, e. g. the polyalkylene polyamines which contain copper in complex combination; such aftertreatment imparts excellent fastness properties, notably fastness to light, washing, water and perspiration.

The 2-amino-1-hydroxybenzenes used as starting materials for the new disazo dyestuffs contain according to this invention an alkylsulfonyl group attached to the nucleus or a sulfonic acid amide group, the nitrogen atom of which may be further substituted. Compounds of this type are the 2-amino-1-hydroxy-4-alkylsulfonylbenzenes, e. g. 2-amino-1-hydroxy-4-methylsulfonylbenzene and 2-amino-1-hydroxybenzene-4- or -5- or -6-sulfonic acid amides. Besides the substituents specified for this invention, the 2-amino-1-hydroxybenzenes may also carry further nuclear substituents, e. g. halogen atoms or alkyl groups, and the sulfonic acid amides may be further substituted in the amine radical. Special mention may be made of the sulfonic acid methylamides, ethylamides, (2'-hydroxy)-ethylamides, (3'-methoxy)-propylamides, cyclohexylamides, benzylamides and phenylamides.

Among the other 2-amino-1-hydroxybenzenes used to produce the new disazo dyestuffs and which may carry further substituents commonly present in the azo dyestuffs, the following may be enumerated: the 2-amino-1-hydroxybenzenes which are substituted by sulfonic acid, nitro, alkyl, acylamino, alkylsulfonyl or sulfonic acid amide groups, the latter of which may be substituted on the nitrogen atom, and/or halogen atoms.

Examples of triazine compounds are cyanuric bromide and, notably, cyanuric chloride.

The process described above for the production of the new disazo dyestuffs may be carried out in a number of ways. For example, 2 moles of the naphthalene

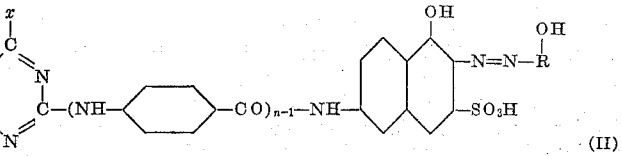

(II)

derivative of general Formula I or 2 moles of a mixture in any desired proportions of two or more different compounds of this type may be condensed with 1 mole of the triazine compound. The condensation of the naphthalene derivatives of general Formula I with the triazine compound is carried out preferably in an aqueous medium and in the presence of an acid-binding agent. The resulting intermediate compound is coupled with 1 mole each of a diazotised 2-amino-1-hydroxybenzene conforming to the above definition or with 2 moles of a mixture in any desired proportions of two or more different diazo compounds of this type. Coupling is best carried out in an alkaline medium and the reaction can be accelerated by an addition of tertiary organic bases, e. g. pyridine, quinoline or a technical mixture of pyridine bases.

In the resulting disazo dyestuffs a third replaceable halogen atom which may be present on the triazine ring can be replaced by a hydroxyl group or a primary, secondary or tertiary amino group by the action of alkali, ammonia or a primary or secondary amine.

Another way in which the process can be performed consists in coupling 1 mole each of a diazotised 2-amino-1-hydroxybenzene conforming to the above definition or 2 moles of a mixture in any desired proportions of two or more different diazo compounds of this type with 2 moles of a naphthalene derivative of general Formula I or with 2 moles of a mixture in any desired proportions of two or more different naphthalene derivatives of this type, and reacting the 2 moles of the aminomonoazo compound with 1 mole of a triazine compound according to the invention. Here also coupling is effected to best advantage in an alkaline medium, so that the diazo groups react with the 6-position of the naphthalene derivatives of general Formula I.

A third method of application of the process, which is suitable for producing those disazo dyestuffs of general Formula II in which n and/or m denote the number 2, consists in linking the diazo compound named in the preceding paragraph with a 2-(4'-nitro)-benzoylamino-5-hydroxy-naphthalene-7-sulfonic acid which may carry further substituents on the benzene nucleus, and reducing the nitro group in the resulting nitromonoazo compound to an amino group. The aminomonoazo dyestuff thus formed is reacted with the triazine compound by the second method of application of the process.

In the second and third methods of application also a halogen atom which may be present in the triazine ring can be replaced by one of the above-named groups.

The following examples illustrate the invention without limiting its scope. All parts and percentages are by weight; temperatures are in degrees centigrade.

*Example 1*

18.7 parts of 2-amino-1-hydroxy-4-methylsulfonylbenzene are dissolved with 15 parts of concentrated hydrochloric acid in 200 parts of water and diazotised at 10° with 6.9 parts of sodium nitrite. The resulting suspension is run into a solution of 350 parts of water, 15 parts of sodium carbonate and 31.3 parts of the ternary condensation product of 1 mole of cyanuric chloride, 2 moles of 2-amino-5-hydroxynaphthalene-7-sulfonic acid and 1 mole of aminobenzene. To accelerate coupling, 5–10 vol. percent pyridine or a technical mixture of pyridine bases is added to the mass. On completion of coupling the disazo dyestuff so formed is salted out, filtered off and dried. It corresponds to the formula

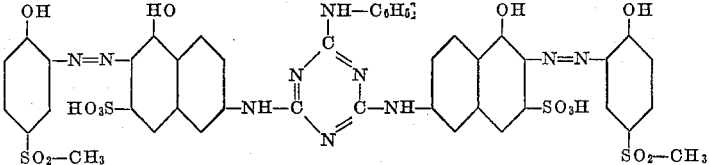

and is a dark-coloured powder which dissolves in water of weakly alkaline reaction to give a violet-coloured solution. From such a solution the dyestuff has very high affinity for cotton and regenerated cellulosic fibers. On subsequent treatment with copper compounds by established methods, the dyeings display clear bluish red shades having very good fastness to washing and perspiration and excellent light fastness.

*Example 2*

To a neutral solution at 0–3° of 23.9 parts of 2-amino-5-hydroxynaphthalene-7-sulfonic acid in 400 parts of water is added in the course of 30 minutes a dispersion of 18.4 parts of finely powdered cyanuric chloride in 500 parts of ice water. Diluted sodium carbonate solution is added dropwise to keep the reaction product weakly acid. The suspension is agitated for afurther hour at 0–3°, then heated to 25°, at which temperature a weakly alkaline solution of 35.8 parts of 2-(4'-amino)-benzoylamino-5-hydroxynaphthalene-7-sulfonic acid in 400 parts of water is added. The mass is stirred for 3 hours at 40–45°, during which time it is fed with a solution of 5.3 parts of sodium carbonate in 500 parts of water. Finally 18 parts of aminobenzene are poured into the condensation mass, which is then heated for 2 hours at 90–95°. Following this 50 parts of concentrated hydrochloric acid are added. The ternary condensation product thus formed is salted out of the condensation solution and filtered off.

A portion of the moist filter-cake equivalent to 38.7 parts of the dry condensation product is dissolved in 400 parts of water with an addition of 15 parts of sodium carbonate. To this solution is added the diazo suspension obtained as described in Example 1 from 18.7 parts of 2-amino-1-hydroxy-4-methylsulfonylbenzene. To accelerate coupling, an addition of pyridine or a mixture of pyridine bases is made. The mass is agitated until coupling is completed, when the resulting disazo dyestuff is salted out, filtered off and dried. It corresponds to the formula

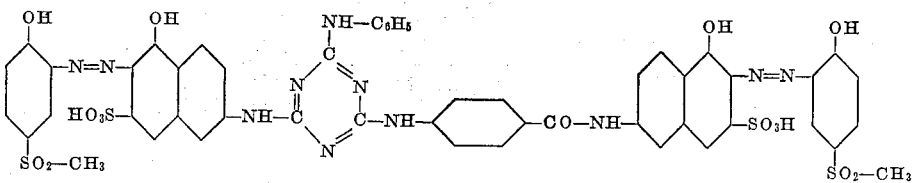

Coppered dyeings of the dyestuff on cotton and regenerated cellulosic fibers are bluish red in shade and possess outstanding fastness to washing and good fastness to light.

*Example 3*

9.2 parts of 2-amino-1-hydroxy-4-methylsulfonylbenzene are diazotised as described in Example 1. The diazo solution is run into a solution of 31.3 parts of the ternary condensation product of 1 mole of cyanuric chloride, 2 moles of 2-amino-5-hydroxynaphthalene-7-sulfonic acid, 1 mole of aminobenzene, and 15 parts of sodium carbonate in 350 parts of water. The coupling mixture is agitated until the diazo compound is no longer indicated. Then an aqueous solution of the diazo compound obtained in the usual way from 10 parts of 2-amino-1-hydroxybenzene-4-sulfonic acid methylamide is added to the mixture, together with 5–10 vol. percent of pyridine or a technical mixture of pyridine bases to accelerate coupling. On completion of coupling the disazo dyestuff thus formed is precipitated from the coupling mixture by means of sodium chloride and then tained in the usual manner from 7.2 parts of 2-amino-1-hydroxy-4-chlorobenzene is added to the mixture, followed by 5–10 vol. percent of pyridine or a technical mixture of pyridine bases to accelerate coupling. When coupling is completed the resulting diazo dyestuff is precipitated from the coupling mixture by an addition of sodium chloride and then filtered off. It is freed of by-products by redissolving in hot water and the purified solution filtered. The dyestuff corresponds to the formula

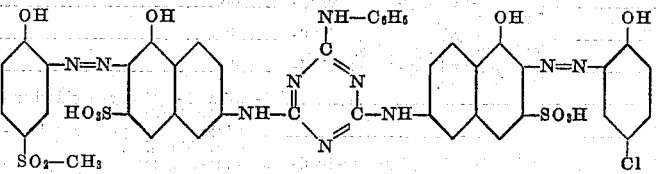

filtered off. By-products are eliminated by re-dissolving in hot water and the dyestuff then dried. It corresponds to the formula and is a dark-coloured powder giving violet-coloured aqueous solutions of weakly alkaline reaction. It has very good affinity for cotton and regenerated cellulosic

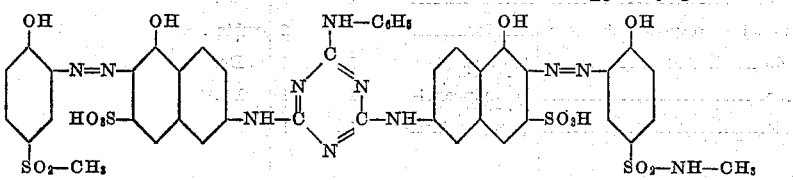

and possesses similar properties to the disazo dyestuff described in Example 1.

Example 4

9.2 parts of 2-amino-1-hydroxy-4-methylsulfonylbenzene are diazotised in the normal way and the diazo solution run into a solution of 31.3 parts of the ternary condensation product of 1 mole of cyanuric chloride, 2 moles of 2-amino-5-hydroxynaphthalene-7-sulfonic acid, 1 mole of aminobenzene and 15 parts of sodium carbonate in 250 parts of water. The coupling mixture is agitated until the diazo compound is no longer indicated. Then an aqueous solution of the diazo compound obfibers. Aftercoppered dyeings on these fibers are bluish red in shade and show very good fastness to washing and perspiration and excellent fastness to light.

The following table lists other copperable disazo dyestuffs which can be obtained in accordance with the directions given in the foregoing examples. They correspond to the general Formula II and are characterised by the diazo components (A) and (B) employed as starting materials for the dyestuffs of general Formula II (columns II and III), the substituent $x$ (column IV) by the values $m$ and $n$ (columns V and VI) and the shade of the aftercoppered dyeing on cotton (column VII).

| I | II | III | IV | V | VI | VII |
|---|---|---|---|---|---|---|
| Example No. | Diazo Component (A) | Diazo Component (B) | $x=$ | $m=$ | $n=$ | Shade of the aftercoppered dyeing on cotton |
| 5 | 2-amino-1-hydroxy-4-methylsulfonylbenzene. | 2-amino-1-hydroxy-4-methylsulfonylbenzene. | phenylamino | 2 | 2 | rubine. |
| 6 | 2-amino-1-hydroxy-4-ethylsulfonylbenzene. | 2-amino-1-hydroxy-4-ethylsulfonylbenzene. | do | 1 | 1 | Do. |
| 7 | 2-amino-1-hydroxybenzene-4-sulfonic acid methylamide. | 2-amino-1-hydroxybenzene-4-sulfonic acid methylamide. | do | 1 | 1 | Do. |
| 8 | 2-amino-1-hydroxybenzene-4-sulfonic acid (3'-methoxy)-propylamide. | 2-amino-1-hydroxybenzene-4-sulfonic acid (3'-methoxy)-propylamide. | do | 1 | 1 | Do. |
| 9 | 2-amino-1-hydroxybenzene-4-sulfonic acid amide. | 2-amino-1-hydroxybenzene-4-sulfonic acid amide. | do | 1 | 1 | Do. |
| 10 | 2-amino-1-hydroxy-4-methylsulfonylbenzene. | 2-amino-1-hydroxybenzene-4-sulfonic acid (2'-hydroxy)-ethylamide. | do | 1 | 1 | Do. |
| 11 | do | 2-amino-1-hydroxybenzene-4-sulfonic acid phenylamide. | do | 1 | 1 | Do. |
| 12 | do | do | cyclohexylamino. | 1 | 1 | Do. |
| 13 | do | 2-amino-1-hydroxybenzene-4-sulfonic acid methylamide. | phenylamino | 1 | 2 | Do. |
| 14 | 2-amino-1-hydroxy-4-ethylsulfonylbenzene. | 2-amino-1-hydroxybenzene-4-sulfonic acid amide. | do | 1 | 1 | Do. |
| 15 | do | do | amino | 1 | 1 | Do. |
| 16 | 2-amino-1-hydroxy-4-methylsulfonylbenzene. | 2-amino-1-hydroxy-4-nitrobenzene. | phenylamino | 1 | 1 | Do. |
| 17 | do | do | hydroxy | 1 | 1 | Do. |
| 18 | 2-amino-1-hydroxybenzene-4-sulfonic acid methylamide. | 2-amino-1-hydroxy-6-chlorbenzene-4-sulfonic acid. | phenylamino | 1 | 1 | Bordeaux. |
| 19 | 2-amino-1-hydroxy-4-methylsulfonylbenzene. | 2-amino-1-hydroxybenzene-4-carboxylic acid phenylamide. | do | 1 | 1 | rubine. |
| 20 | 2-amino-1-hydroxy-4-ethylsulfonylbenzene. | 2-amino-1-hydroxy-4-nitrobenzene. | do | 1 | 1 | Do. |
| 21 | do | | chlorine | 1 | 1 | Do. |
| 22 | 2-amino-1-hydroxybenzene-4-sulfonic acid amide. | 2-amino-1-hydroxy-4-chlorbenzene. | do | 1 | 1 | Bordeaux. |
| 23 | do | do | methylamino | 1 | 1 | Do. |
| 24 | 2-amino-1-hydroxybenzene-4-sulfonic acid methylamide. | do | phenylamino | 1 | 1 | Do. |
| 25 | do | do | hydroxyethylamino. | 1 | 1 | Do. |

| I | II | III | IV | V | VI | VII |
|---|---|---|---|---|---|---|
| Example No. | Diazo Component (A) | Diazo Component (B) | $x=$ | $m=$ | $n=$ | Shade of the after-coppered dyeing on cotton |
| 26 | 2-amino-1-hydroxy-4-methylsulfonylbenzene. | ...do... | phenylamino.. | 1 | 1 | Do. |
| 27 | 2-amino-1-hydroxybenzene-4-sulfonic acid methylamide. | ...do... | ...do... | 1 | 1 | Do. |
| 28 | 2-amino-1-hydroxy-4-methylsulfonylbenzene. | ...do... | ...do... | 1 | 1 | Do. |
| 29 | ...do... | 2-amino-1-hydroxy-6-chlorbenzene-4-sulfonic acid. | ...do... | 2 | 2 | Do. |
| 30 | ...do... | 2-amino-1-hydroxybenzene-4-sulfonic acid amide. | ...do... | 1 | 2 | rubine. |
| 31 | 2-amino-1-hydroxybenzene-4-sulfonic acid amide. | 2-amino-1-hydroxy-4-methylbenzene. | ...do... | 1 | 1 | Do. |
| 32 | 2-amino-1-hydroxybenzene-4-sulfonic acid phenylamide. | 2-amino-1-hydroxy-6-chlorbenzene-4-sulfonic acid. | ...do... | 1 | 1 | Bordeaux. |
| 33 | 2-amino-1-hydroxybenzene-4-sulfonic acid cyclohexylamide. | ...do... | ...do... | 1 | 1 | Do. |
| 34 | 2-amino-1-hydroxybenzene-4-sulfonic acid benzylamide. | ...do... | ...do... | 1 | 1 | Do. |
| 35 | 2-amino-1-hydroxy-4-ethylsulfonylbenzene. | 2-amino-1-hydroxy-4-nitrobenzene. | ...do... | 1 | 2 | rubine. |
| 36 | 2-amino-1-hydroxy-4-methylsulfonylbenzene. | ...do... | ...do... | 4-methoxyphenylamino. | 1 | 1 | Do. |
| 37 | ...do... | ...do... | methylphenylamino. | 1 | 1 | Do. |
| 38 | 2-amino-1-hydroxybenzene-4-sulfonic acid (2'-hydroxy)-ethylamide. | ...do... | phenylamino.. | 1 | 1 | Do. |

Representative examples are 7, 26 and 27. The formulae of the thus-obtained dyestuffs are:

The cotton is removed, rinsed in running water and squeezed.

*Example 7*

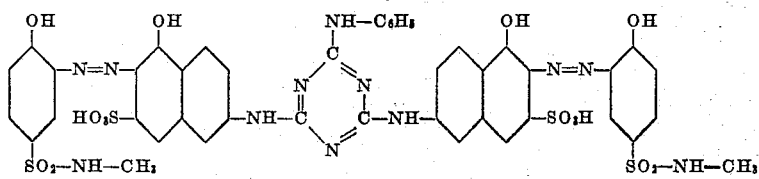

*Example 26*

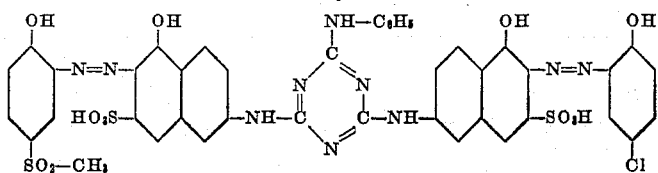

*Example 27*

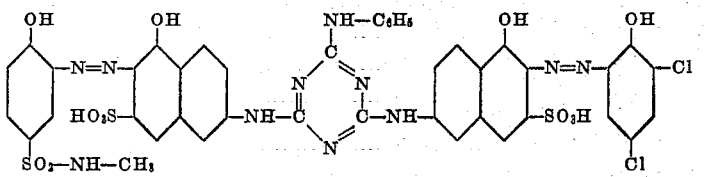

*Example 39*

100 parts of cotton fabric, thoroughly wetted out, are entered into a dyebath at 30° containing 3000 parts of water, 0.7 part of anhydrous sodium carbonate, 0.7 part of the concentrated dyestuff obtained according to Example 1, and 10 parts of crystallised sodium sulfate. The dyebath is heated to 100° in 30 minutes, two portions each of 10 parts of crystallised sodium sulfate being added at 50° and 90°. The cotton is dyed for 15 minutes at the boil, then a further 10 parts of crystallised sodium sulfate are added and the dyebath cooled for 15 minutes.

While still moist the material is treated for 30 minutes in an aftercoppering bath at 70° containing 3000 parts of water, 3 parts of crystallised copper sulfate and 3 parts of glacial acetic acid. Finally the cotton is rinsed and dried. It is dyed in a bluish red shade of very good fastness to washing and perspiration and excellent fastness to light.

Having thus disclosed the invention what is claimed is:

1. The copperable disazo dyestuffs which correspond to the formula

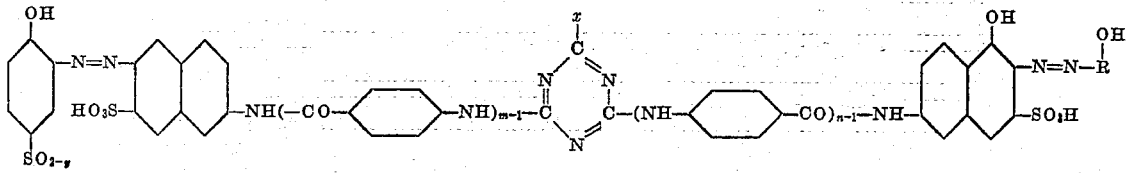

wherein $x$ stands for a member selected from the group consisting of a chlorine atom, the hydroxy group and primary and secondary aliphatic and carbocyclic amine groups, $y$ stands for a member selected from the group consisting of lower alkyl, amino, lower alkylamino, lower hydroxyalkylamino, lower alkoxyalkylamino, cyclohexylamino, benzylamino and arylamino groups of the benzene series, HO—R stands for a substituted residue of a hydroxybenzene, the hydroxy group of which is in ortho-position to the —N=N-group and the substituents of which being selected from the group consisting of a chlorine atom, nitro, lower alkyl, mononuclear carboxylic acid aryl amide, sulfonic acid, lower alkylsulfonyl, sulfonic acid amide, sulfonic acid lower alkylamide, sulfonic acid lower hydroxyalkylamide, sulfonic acid lower alkoxyalkylamide, sulfonic acid cyclohexylamide, sulfonic acid benzylamide and sulfonic acid arylamide groups of the benzene series, and $m$ and $n$ each stands for one of the numerals 1 and 2.

2. The copperable disazo dyestuff which corresponds to the formula

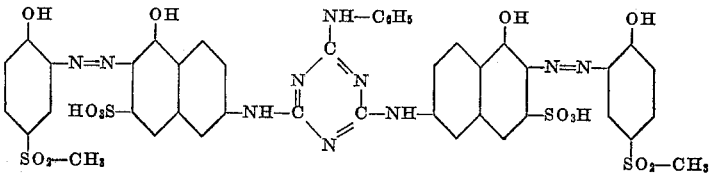

3. The copperable disazo dyestuff which corresponds to the formula

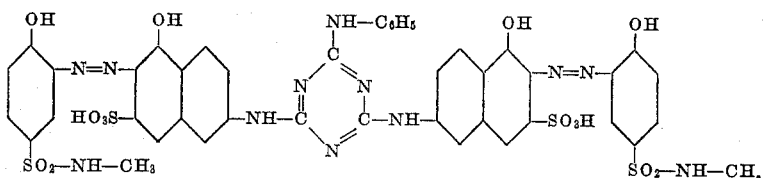

4. The copperable disazo dyestuff which corresponds to the formula

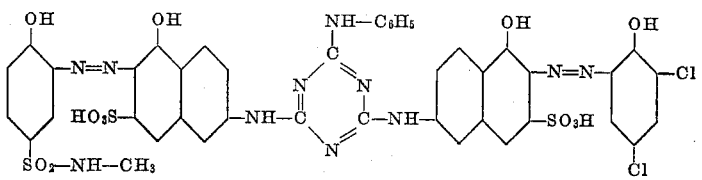

5. The copperable disazo dyestuff which corresponds to the formula

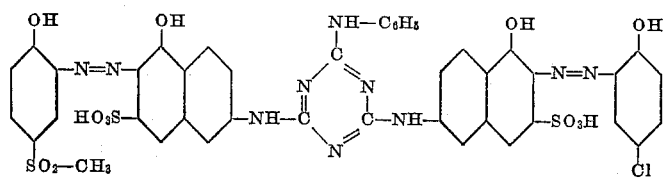

6. The copperable disazo dyestuff which corresponds to the formula

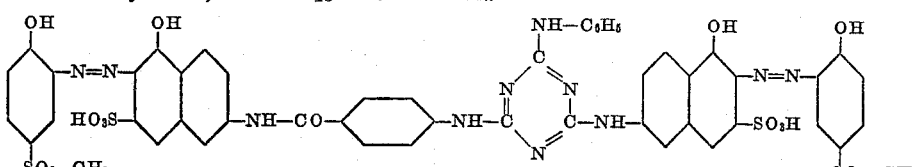

References Cited in the file of this patent
UNITED STATES PATENTS

| | | |
|---|---|---|
| 1,667,312 | Fritzsche et al. | Apr. 24, 1928 |
| 2,460,618 | Bernasconi | Feb. 1, 1949 |
| 2,538,568 | Kaiser et al. | Jan. 16, 1951 |
| 2,722,527 | Wehrli et al. | Nov. 1, 1955 |